(12) United States Patent
Li et al.

(10) Patent No.: US 12,117,168 B2
(45) Date of Patent: Oct. 15, 2024

(54) REVERSE-JET SWIRL PULVERIZED COAL BURNER WITH MULTI-STAGE RECIRCULATIONS

(71) Applicant: TSINGHUA UNIVERSITY, Beijing (CN)

(72) Inventors: Shui-Qing Li, Beijing (CN); Min-Hang Song, Beijing (CN); Qi Gao, Beijing (CN); Yang Xu, Beijing (CN); Jian-Kun Zhuo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 517 days.

(21) Appl. No.: 17/478,896

(22) Filed: Sep. 18, 2021

(65) Prior Publication Data
US 2022/0003408 A1    Jan. 6, 2022

Related U.S. Application Data

(63) Continuation of application No. PCT/CN2020/082896, filed on Apr. 2, 2020.

(30) Foreign Application Priority Data

Apr. 10, 2019   (CN) .......................... 201910283921.6

(51) Int. Cl.
*F23D 1/02* (2006.01)
(52) U.S. Cl.
CPC ...................... *F23D 1/02* (2013.01)
(58) Field of Classification Search
CPC ................... F23D 1/02; F23D 2201/20; F23D 2900/01001
See application file for complete search history.

(56) References Cited

U.S. PATENT DOCUMENTS

| 5,415,114 A * | 5/1995 | Monro | ...................... F23D 1/02 431/9 |
| 2002/0069757 A1* | 6/2002 | Lehn | ......................... F23D 1/02 55/455 |

(Continued)

FOREIGN PATENT DOCUMENTS

| CN | 1074993 | 8/1993 |
| CN | 200968599 | 10/2007 |

(Continued)

OTHER PUBLICATIONS

International Search Report of PCT/CN2020/082896.
(Continued)

*Primary Examiner* — David J Laux (57) ABSTRACT

A reverse-jet swirl pulverized coal burner with multi-stage recirculations includes a pre-combustion housing, a primary coal-air structure, a rich-lean output structure, an inner secondary air structure, and an outer secondary air structure. The pre-combustion housing has a pre-combustion chamber and a housing outlet. The primary coal-air structure is configured to separate a primary coal-air flow into a fuel-rich coal-air flow and a fuel-lean coal-air flow. The rich-lean output structure is configured to output the fuel-lean coal-air flow and block the fuel-rich coal-air flow to make the fuel-rich coal-air flow reversely flow to the pre-combustion chamber. The inner secondary air structure is configured to introduce an inner secondary air into the pre-combustion chamber, thereby forming a first-stage recirculation zone in the pre-combustion chamber and forming a second-stage recirculation zone. The outer secondary air structure is configured to form a third-stage recirculation zone at the housing outlet.

15 Claims, 6 Drawing Sheets

(56) References Cited

U.S. PATENT DOCUMENTS

| | | | | |
|---|---|---|---|---|
| 2003/0104328 A1* | 6/2003 | Kobayashi | ............. | F23C 6/047 |
| | | | | 431/10 |
| 2008/0092789 A1* | 4/2008 | Takashima | ................ | F23D 1/00 |
| | | | | 110/104 B |
| 2014/0373763 A1* | 12/2014 | LaRue | .................... | F23C 9/003 |
| | | | | 110/264 |

FOREIGN PATENT DOCUMENTS

| | | |
|---|---|---|
| CN | 107606607 | 1/2018 |
| CN | 208025506 | 10/2018 |
| CN | 109140433 | 1/2019 |
| CN | 109595548 | 4/2019 |
| CN | 110043898 | 7/2019 |
| FR | 2580379 | 10/1986 |

OTHER PUBLICATIONS

Journal of Engineering Thermophysics, No. 2, Mar. 10, 1994. Zhao Huifu, Yang Ping, Precombustor Burner by Using Multiple Opposed Jets.

Journal of Zhejiang University, No. 6, Jun. 25, 1987. Chen Jianrong et al., On Intensifying the Ignition of Coal Water Slurry(CWS) Spray with a Swirling Pre-combustor.

* cited by examiner

REVERSE-JET SWIRL PULVERIZED COAL BURNER WITH MULTI-STAGE RECIRCULATIONS

CROSS-REFERENCE TO RELATED APPLICATIONS

The present application claims priority of China Patent Application No. 201910283921.6, filed on Apr. 10, 2019, entitled "REVERSE-JET SWIRL PULVERIZED COAL BURNER WITH MULTI-STAGE RECIRCULATIONS", the content of which is hereby incorporated by reference in its entirety. The present application is a continuation under 35 U.S.C. § 120 of international patent application PCT/CN2020/082896, filed on Apr. 2, 2020, entitled "REVERSE-JET SWIRL PULVERIZED COAL BURNER WITH MULTI-STAGE RECIRCULATIONS", the content of which is also hereby incorporated by reference in its entirety.

TECHNICAL FIELD

The present application relates to the technical field of pulverized coal combustion equipment, and particularly relates to a reverse-jet swirl pulverized coal burner with multi-stage recirculations.

BACKGROUND

In China, coal-fired industrial boilers are the main coal combustion equipment other than power plant boilers. Conventional coal-fired industrial boilers are mainly laminar combustion grate boilers and chain grate boilers. Lump coal is placed on a stationary or traveling grate to form a fuel layer. Air is introduced from the bottom of the grate, and flows through the fuel layer for combustion reaction. Limited by combustion space and effective reaction area, this type of boiler generally has a problem of low thermal efficiency.

In recent years, with the continuous development of pulverized coal processing, transportation, storage, and combustion technologies, chamber combustion of pulverized coal has gradually replaced coal laminar combustion, and has been widely used in coal-fired boilers. This approach adopts air-carrying pulverized coal particles, which are sprayed into the furnace for suspension combustion, thereby enhancing mixing and contact between gas and solid and improving combustion efficiency and thermal efficiency of the boiler. However, in actual operation, compared with power plant boilers, industrial boilers have operating characteristics that characteristics of pulverized coal are great differentiated and boiler loads are widely varied. Whereas, most of present design guidelines for industrial pulverized coal boilers are based on specific selected coal types and a full-load operating condition, resulting in many problems such as poor combustion stability, great mechanical loss in incomplete combustion, and large $NO_x$ emissions when other coal types are used or mixed or the boiler is operated at a low load.

With the gradually increased attention of the country to environmental protection issues, the existing pulverized coal combustion technology of industrial boilers is difficult to meet the increasingly strict pollutant emission standards. The development of pulverized coal combustion equipment with high efficiency, low $NO_x$ generation, strong coal-type adaptability, and strong combustion stability at a low load for industrial pulverized coal boilers has become an urgent need in the industry.

SUMMARY

In view of this, there is a need to provide a reverse-jet swirl pulverized coal burner with multi-stage recirculations.

A reverse-jet swirl pulverized coal burner with multi-stage recirculations includes:
  a pre-combustion housing, the pre-combustion housing having a pre-combustion chamber and a housing outlet located on one side of the pre-combustion chamber;
  a primary coal-air structure passing through the pre-combustion housing and extending into the pre-combustion chamber, the primary coal-air structure being configured to separate a primary coal-air flow into a fuel-rich coal-air flow and a fuel-lean coal-air flow, and an outlet end of the primary coal-air structure extending toward the housing outlet;
  a rich-lean output structure disposed at the outlet end of the primary coal-air structure, the rich-lean output structure being configured to output the fuel-lean coal-air flow and block the fuel-rich coal-air flow to make the fuel-rich coal-air flow reversely flow to the pre-combustion chamber;
  an inner secondary air structure disposed on the pre-combustion housing and around the primary coal-air structure, the inner secondary air structure is configured to introduce an inner secondary air into the pre-combustion chamber, thereby forming a first-stage recirculation zone in the pre-combustion chamber and forming a second-stage recirculation zone at an end of the rich-lean output structure away from the primary coal-air structure; and
  an outer secondary air structure sleeved outside the pre-combustion housing, the outer secondary air structure being configured to transport an outer secondary air, thereby forming a third-stage recirculation zone at the housing outlet.

In an embodiment, the pre-combustion housing includes a cone section and an expansion section connected to the cone section. An end of the expansion section away from the cone section is the housing outlet of the pre-combustion housing. An inclination angle of the expansion section is greater than an inclination angle of the cone section.

In an embodiment, the inclination angle α of the cone section satisfies 0°<α≤20°, and the inclination angle β of the expansion section is in a range from 20° to 50°.

In an embodiment, the primary coal-air structure includes a primary coal-air flow pipe, a fixing axle, and a plurality of swirl vanes. The fixing axle is located adjacent to an outlet end of the primary coal-air flow pipe. The plurality of swirl vanes are connected to an inner wall of the primary coal-air flow pipe and the fixing axle, and are configured to separate the primary coal-air flow into the fuel-rich coal-air flow and the fuel-lean coal-air flow.

In an embodiment, the rich-lean output structure includes a recirculation baffle and a fuel-lean coal-air flow pipe penetrating through the recirculation baffle. The recirculation baffle is located at the outlet end of the primary coal-air flow pipe. A surface of the recirculation baffle facing the primary coal-air flow pipe has a recirculation slot. The recirculation slot is configured to guide the fuel-rich coal-air flow to flow reversely to the pre-combustion chamber. A shape of an inner wall of the recirculation slot is straight or curved. A fuel-rich coal-air flow channel with a circular cross-section is formed between the inner wall of the recirculation slot and an outer wall of the primary coal-air flow pipe to reverse the fuel-rich coal-air flow. The fuel-lean coal-air flow pipe, having one end extending into a central area of the outlet end of the primary coal-air flow pipe, is configured to output the fuel-lean coal-air flow coming from the primary coal-air flow pipe.

In an embodiment, the recirculation baffle has a conical shape, and a cross-sectional size of an end of the recirculation baffle toward the primary coal-air flow pipe is smaller than a cross-sectional size of another end of the recirculation baffle away from the primary coal-air flow pipe. The rich-lean output structure includes a fixing rib that connects the recirculation baffle to the primary coal-air flow pipe.

In an embodiment, the inner secondary air structure includes a strong-swirl inner secondary air assembly, a weak-swirl inner secondary air assembly, and a direct-flow inner secondary air channel. The strong-swirl inner secondary air assembly is sleeved outside the primary coal-air structure. The weak-swirl inner secondary air assembly is sleeved outside the strong-swirl inner secondary air assembly. The direct-flow inner secondary air channel is sleeved outside the weak-swirl inner secondary air assembly. Tangential swirling speeds of the secondary air respectively conveyed by the strong-swirl inner secondary air assembly, the weak-swirl inner secondary air assembly, and the direct-flow inner secondary air channel gradually decrease.

In an embodiment, the strong-swirl inner secondary air assembly includes a strong-swirl inner secondary air channel and strong-swirl axial vanes disposed in the strong-swirl inner secondary air channel. The strong-swirl axial vanes are configured to make the inner secondary air in the strong-swirl inner secondary air channel have a tangential swirling speed.

In an embodiment, an outlet angle θ of the strong-swirl axial vanes ranges from 50° to 80°.

In an embodiment, the weak-swirl inner secondary air assembly includes a weak-swirl inner secondary air channel and weak-swirl axial vanes disposed in the weak-swirl inner secondary air channel. The weak-swirl axial vanes are configured to make the inner secondary air in the weak-swirl inner secondary air channel have a tangential swirling speed.

In an embodiment, an outlet angle δ of the weak-swirl axial vanes ranges from 20° to 50°.

In an embodiment, the reverse-jet swirl pulverized coal burner further includes an annular connector. The annular connector is located between the strong-swirl inner secondary air assembly and the primary coal-air structure, and connects and fixes the strong-swirl inner secondary air assembly to the primary coal-air structure.

In an embodiment, the outer secondary air structure includes an outer secondary air inlet channel, an outer secondary air outlet channel, and tangential vanes. The outer secondary air inlet channel and the outer secondary air outlet channel are connected and fluid communicated in a stepped manner. The tangential vanes are disposed in a connection area between the outer secondary air inlet channel and the outer secondary air outlet channel.

In an embodiment, an outlet angle γ of the tangential vane ranges from 15° to 40°.

In an embodiment, the outer secondary air structure further includes a separation annulus. The separation annulus is disposed at an end of the outer secondary air outlet channel, and located on the outer wall of the expansion section.

By adopting the above technical solutions, the present application has at least the following technical effects:

In the reverse jet swirl pulverized coal burner with multi-stage recirculations of the present application, the primary coal-air structure separates the primary coal-air flow into the fuel-rich coal-air flow and the fuel-lean coal-air flow. After being blocked by the rich-lean output structure, the fuel-rich coal-air flow reversely flows to the pre-combustion chamber, and cooperates with the inner secondary air to form the first-stage recirculation zone in the pre-combustion chamber. The fuel-rich coal-air flow is entrained into the first-stage recirculation zone, burns, and releases heat. Meanwhile, as the recirculation baffle has a conical shape, a second-stage recirculation zone is formed at the side of the rich-lean output structure away from the primary coal-air structure, in which the fuel-lean coal-air flow is heated and ignited. After that, the airflows and unburned coal particles in the pre-combustion chamber are ejected out from the housing outlet of the pre-combustion housing. The outer secondary air structure forms the outer secondary air into a third-stage recirculation zone at the housing outlet, which further promotes burnout and stable combustion of the unburned pulverized coal, which is finally sprayed into a furnace. As such, the primary coal-air flow is concentrated and separated, and then undergone combustion in three stages of recirculation zones, which is beneficial to ignition, stable combustion, and burnout of pulverized coal under different coal types and boiler load conditions while reducing $NO_x$ production during the pulverized coal combustion. The problems of insufficient pulverized coal burnout, poor combustion stability at a low load, and high $NO_x$ emission in current industrial pulverized coal boilers are effectively solved.

Wherein:

100-reverse-jet swirl pulverized coal burner with multi-stage recirculations; 110-pre-combustion housing; 111-pre-combustion chamber; 112-cone section; 113-expansion section; 120-primary coal-air structure; 121-primary coal-air flow pipe; 122-fixing axle; 123-swirl vane; 130-rich-lean output structure; 131-recirculation baffle; 1311-recirculation slot; 132-fuel-lean coal-air flow pipe; 133-fuel-rich coal-air flow channel; 134-fixing rib; 140-inner secondary air structure; 141-strong-swirl inner secondary air assembly; 1411-strong-swirl inner secondary air channel; 1412-strong-swirl axial vane; 142-weak-swirl inner secondary air assembly; 1421-weak-swirl inner secondary air channel; 1422-weak-swirl axial vane; 143-direct-flow inner secondary air channel; 1431-supporting rib; 150-outer secondary air structure; 151-outer secondary air inlet channel; 152-outer secondary air outlet channel; 153-tangential vane; 154-separation annulus; 160-annular connector.

DETAILED DESCRIPTION

The reverse-jet swirl pulverized coal burner with multi-stage recirculations of the present application will now be described in detail with reference to the accompanying drawings and embodiments in order to make the objects, technical solutions, and advantages of the present application more clear. It should be understood that the specific embodiments described herein are only for explaining the present application, and not intended to limit the present application.

The serial numbers assigned to the components herein, such as "first", "second", etc., are merely used to distinguish the described objects and do not have any sequence or technical meaning. The meanings of "connection" and "joining" mentioned in the present application include direct and indirect connection (joining) unless otherwise specified. In the description of the present application, it should be understood that the terms "upper", "lower", "front", "rear", "left", "right", "vertical", "horizontal", "top", "bottom", "inner", "outer", "clockwise", "counterclockwise", etc. indicate the orientations or positional relationships on the basis of the drawings. These terms are only for describing the present invention and simplifying the description, rather than indicating or implying that the related devices or elements must have the specific orientations, or be constructed or operated in the specific orientations, and therefore cannot be understood as limitations of the present application.

In the present application, unless expressly stipulated and defined otherwise, a first feature, when referred to as being located "on" or "under" a second feature, may be in direct contact with the second feature, or in indirect contact with the second feature via an intermediate element. Moreover, a first feature, when referred to as being located "on", "above", "over" a second feature, may be located right above or obliquely above the second feature, or merely located at a horizontal level higher than the second feature; a first feature, when referred to as being located "under", "below", "beneath" a second feature, may be located right below or obliquely below the second feature, or merely located at a horizontal level lower than the second feature.

Referring to FIG. 1 to FIG. 9, the present application provides a reverse-jet swirl pulverized coal burner 100 with multi-stage recirculations. The reverse-jet swirl pulverized coal burner 100 can be applied in an industrial pulverized coal boiler. The reverse-jet swirl pulverized coal burner 100 of the present application can realize the separation between rich and lean pulverized coal, multi-stage recirculations of air flow, and air-staged combustion, which is beneficial to ignition, stable combustion, and burnout of pulverized coal under the conditions of different coal types and different boiler loads, and can reduce $NO_x$ generation during combustion of pulverized coal.

Figure 1:
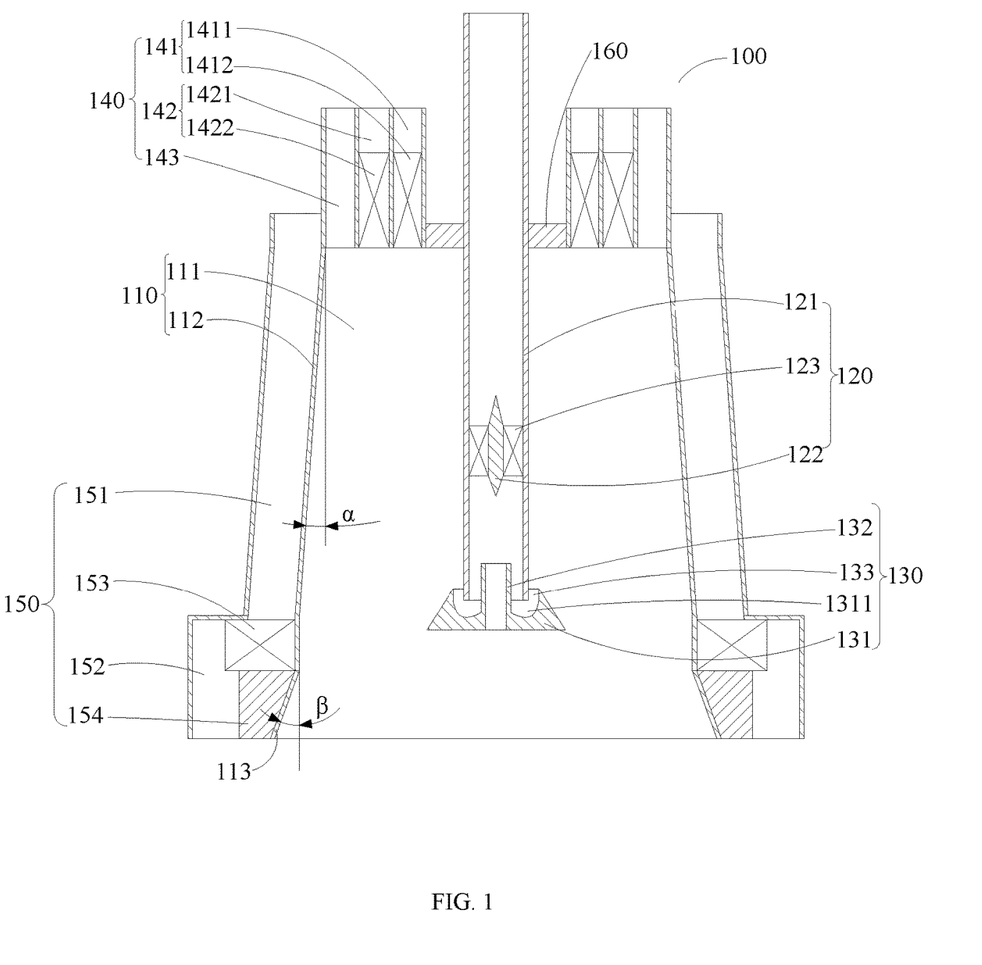
FIG. 1 is a front cross-sectional view of a reverse-jet swirl pulverized coal burner with multi-stage recirculations according to an embodiment of the present application.
Figure 2:
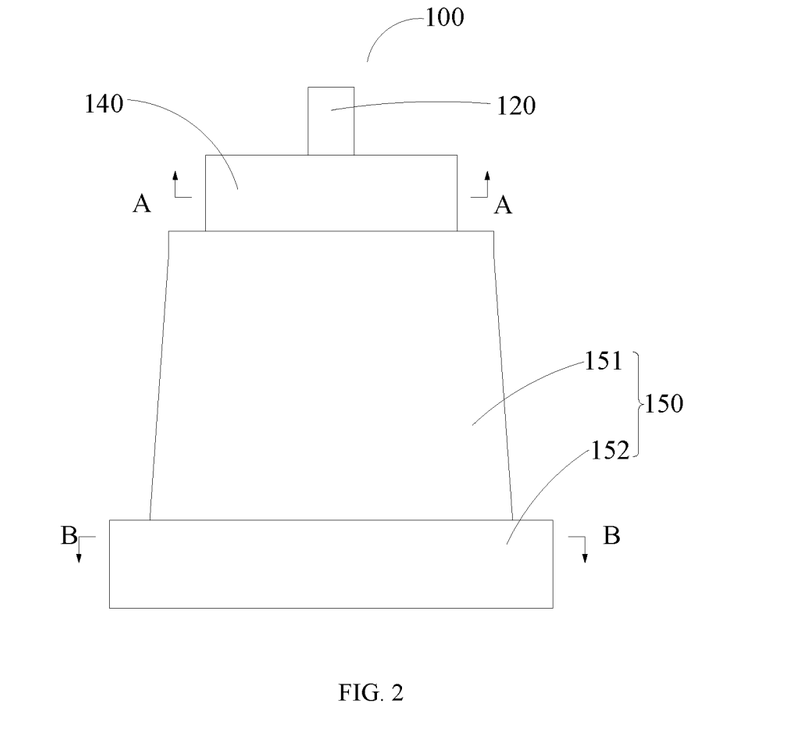
FIG. 2 is a side view of the reverse-jet swirl pulverized coal burner with multi-stage recirculations shown in FIG. 1.
Figure 3:
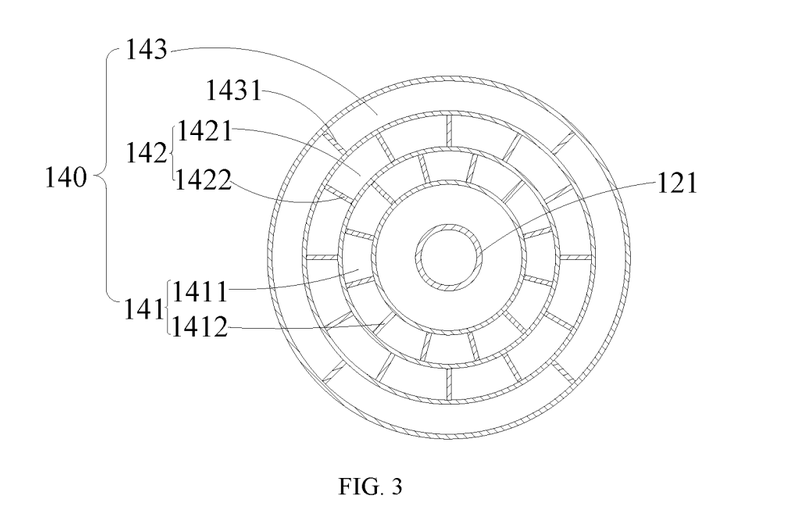
FIG. 3 is a cross-sectional view along A-A of the reverse-jet swirl pulverized coal burner with multi-stage recirculations shown in FIG. 2.

In an embodiment, the reverse jet swirl pulverized coal burner 100 includes a pre-combustion housing 110, a primary coal-air structure 120, a rich-lean output structure 130, an inner secondary air structure 140, and an outer secondary air structure 150. The primary coal-air structure 120 partially extends into the pre-combustion housing 110, and is fluid communicated with the pre-combustion housing 110. The rich-lean output structure 130 is located at the end of the primary coal-air structure 120 in the pre-combustion housing 110. The inner secondary air structure 140 is sleeved outside the primary coal-air structure 120 and is located at an end of the pre-combustion housing 110, and the inner secondary air structure 140 is fluid communicated with the pre-combustion housing 110. The outer secondary air structure 150 is sleeved outside the pre-combustion housing 110.

Figure 9:
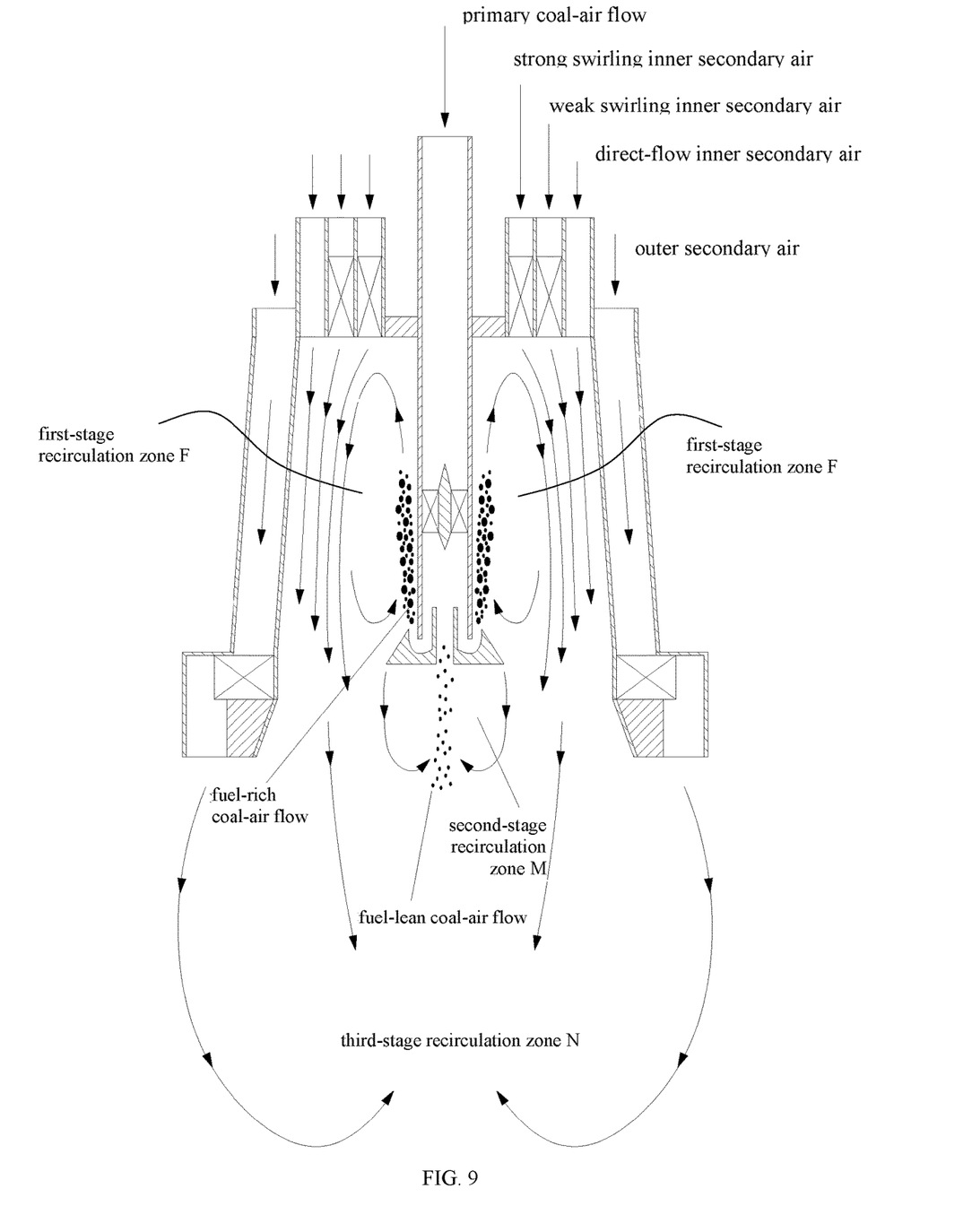
FIG. 9 is a principle view of the reverse jet swirl pulverized coal burner with multi-stage recirculations shown in FIG. 1.

Specifically, the pre-combustion housing 110 has a pre-combustion chamber 111 and a housing outlet located at one side of the pre-combustion chamber 111. The primary coal-air structure 120 passes through the pre-combustion housing 110 and extends into the pre-combustion chamber 111 to separate a primary coal-air flow into a fuel-rich coal-air flow and a fuel-lean coal-air flow. An outlet end of the primary coal-air structure 120 extends toward the housing outlet. The rich-lean output structure 130 is disposed at an outlet end of the primary coal-air structure 120. The rich-lean output structure 130 is configured to output the fuel-lean coal-air flow and block the fuel-rich coal-air flow to make the fuel-rich coal-air flow reversely flow to the pre-combustion chamber 111. The inner secondary air structure 140 is disposed on the pre-combustion housing 110 and around the primary coal-air structure 120. The inner secondary air structure 140 is configured to introduce an inner secondary air into the pre-combustion chamber 111, thereby forming a first-stage recirculation zone F in the pre-combustion chamber 111 and forming a second-stage recirculation zone M at an end of the rich-lean output structure 130 away from the primary coal-air structure 120. The outer secondary air structure 150 is sleeved outside the pre-combustion housing 110, and is configured to transport an outer secondary air, thereby forming a third-stage recirculation zone N at the housing outlet.

The primary coal-air structure 120 introduces the primary coal-air flow into the pre-combustion chamber 111 of the pre-combustion housing 110. During the introducing of the primary coal-air flow, the primary coal-air structure 120 separates the primary coal-air flow to form the fuel-rich coal-air flow and the fuel-lean coal-air flow. When flowing from the primary coal-air structure 120 to the pre-combustion chamber 111, the separated fuel-rich coal-air flow and fuel-lean coal-air flow is guided into the pre-combustion chamber 111 in different directions by the rich-lean output structure 130. The fuel-rich coal-air flow entered the rich-lean output structure 130 is blocked by the rich-lean output structure 130, causing the fuel-rich coal-air flow to flow in a reversed direction. That is to say, the fuel-rich coal-air flow in the pre-combustion chamber 111 flows in the direction opposite to a flowing direction. The flowing direction refers to the direction of the primary coal-air flow entering the pre-combustion chamber 111. The fuel-lean coal-air flow continues to flow in the flow direction after passing through the rich-lean output structure 130.

At the same time, the inner secondary air flows into the pre-combustion chamber 111 through the inner secondary air structure 140 and surrounds the primary coal-air structure 120. The inner secondary air, during the flowing, interacts with the fuel-rich coal-air flow which flows in the reversed direction to form the first-stage recirculation zone F in the combustion chamber 111. Because the reversely flowing fuel-rich coal-air flow can be easily entrained into the first-stage recirculation zone F, the fuel-rich coal-air flow whirls, burns, and releases heat in the first-stage recirculation zone F to generate a high-temperature flow, which then passes by the rich-lean output structure 130 and ejects out from the housing outlet of the pre-combustion housing 110. In addition, when passing by the rich-lean output structure 130, the high-temperature flow forms the second-stage recirculation zone M at the side of the rich-lean output structure 130 away from the primary coal-air structure 120. A reunion between this portion of reversely flowing high-temperature flow and the fuel-lean coal-air flow ejected out from the rich-lean output structure 130 promotes elevating temperature of the fuel-lean coal-air flow, and thus heats and ignites the fuel-lean coal-air flow.

Then, the airflows and unburned coal particles in the pre-combustion chamber 111 are ejected out from the housing outlet of the pre-combustion housing 110. At this time, the outer secondary air is output from the outer secondary air structure 150 to the outside of the pre-combustion housing 110, thereby forming a third-stage recirculation zone N at the housing outlet of the pre-combustion housing 110, and thus also generating a high-temperature recirculation fluid at the outlet of the reverse-jet swirl pulverized coal burner 100 with multi-stage recirculations, which further promotes burnout and stable combustion of the unburned coal particles ejected from the pre-combustion chamber 111. In addition, the amount of oxygen required at the initial stage of pulverized coal combustion is respectively supplied in two stages by inner secondary air structure 140 and outer secondary air structure 150, so that pulverized coal is always burned in a reducing atmosphere, thereby reducing $NO_x$ generation during the combustion of pulverized coal.

In this way, after the primary coal-air flow is concentrated and separated, it is burned in three stages of recirculation zone, which is conducive to the ignition, stable combustion, and burnout of pulverized coal with different coal types and under different load conditions, and is conducive to reduce $NO_x$ generation in the pulverized coal combustion process, thereby effectively solving the problems of insufficient pulverized coal burnout, poor combustion stability at a low load, and high $NO_x$ emissions in a current industrial pulverized coal boiler.

In an embodiment, the pre-combustion housing 110 includes a cone section 112. The cross-sectional size of the cone section 112 gradually increases along the flow direction of the primary coal-air flow in the primary coal-air structure 120. In this way, as the swirling inner secondary air adjacent to the primary coal-air structure 120 driving the primary coal-air flow to flow, a low pressure zone is formed in the central area of the swirling air flow. In addition, the side wall of the cone section 112 of the pre-combustion housing 110 has an inclination angle. During the flowing of the inner secondary air from top to bottom in the pre-combustion housing 110, the flow area of the air flow gradually expands, so that the flow rate of the air flow decreases, and the static pressure gradually increases. The above two reasons work together to make part of the inner secondary air flow reversely to the low pressure zone during the flowing of the inner secondary air in the pre-combustion chamber 111, thus forming the first-stage recirculation zone F in the pre-combustion chamber 111.

In an embodiment, the pre-combustion housing 110 further includes an expansion section 113 connected to the cone section 112. An end of the expansion section 113 away from the cone section 112 is the housing outlet of the pre-combustion housing 110. The cross-sectional size of the expansion section 113 gradually increases along the flow direction of the primary coal-air flow in the primary coal-air structure 120.

In an embodiment, the inclination angle of the expansion section 113 is greater than the inclination angle of the cone section 112. In a further embodiment, the range of the inclination angle α of the cone section 112 is 0°<α≤20°. The inclination angle β of the expansion section 113 is in a range from 20° to 50°.

Figure 8:
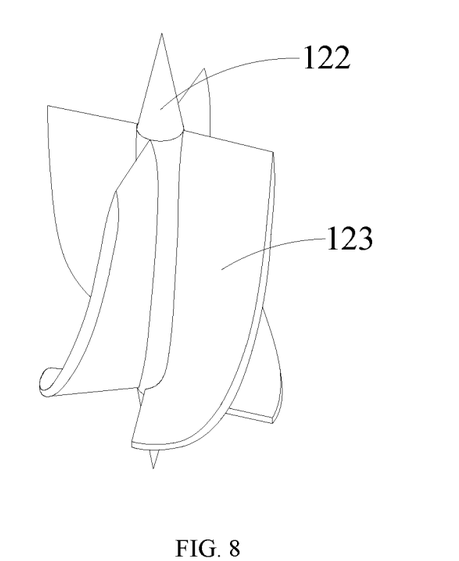
FIG. 8 is a perspective view of swirl vanes of a primary coal-air structure in the reverse-jet swirl pulverized coal burner with multi-stage recirculations shown in FIG. 1.

In an embodiment, the primary coal-air structure 120 includes a primary coal-air flow pipe 121, a fixing axle 122, and a plurality of swirl vanes 123. The fixing axle 122 is located adjacent to an outlet end of the primary coal-air flow pipe 121. The plurality of swirl vanes 123 are connected to the inner wall of the primary coal-air flow pipe 121 and the fixing axle 122, and are configured to separate the primary coal-air flow into the fuel-rich coal-air flow and the fuel-lean coal-air flow. The fixing axle 122 is configured to fix the swirl vanes 123. The swirl vanes 123 can make the primary coal-air flow passed therethrough flow swirly.

The primary coal-air flow is introduced from the end of the primary coal-air flow pipe 121 outside the pre-combustion housing 110, and flows initially in a straight line after entering the primary coal-air flow pipe 121. Under the action of the swirl vanes 123, the primary coal-air flow passing the swirl vanes 123 is transformed from a straight line flow (i.e., a direct flow) to a high-speed swirling flow. During the high-speed swirling of the primary coal-air flow, the coal particles, due to the high density thereof, are subjected to a large centrifugal force and thrown to the region adjacent to the inner wall of the primary coal-air flow pipe 121, so that the pulverized coal in the region adjacent to the inner wall of the primary coal-air flow pipe 121 has a higher concentration, and the pulverized coal in the central area of the primary coal-air flow pipe 121 has a lower concentration. The pulverized coal air flow further flows in the primary coal-air flow pipe 121, and is output and formed the fuel-rich coal-air flow and the fuel-lean coal-air flow through the rich-lean output structure 130. The fuel-rich coal-air flow flows in the reversed direction to the pre-combustion chamber 111. The fuel-lean coal-air flow flows into the pre-combustion chamber 111 in a straight line through a fuel-lean coal-air flow pipe 132 in the rich-lean output structure 130.

It can be understood that the primary coal-air flow can be concentrated by passing through the swirl vanes 123, so that the pulverized coal concentration in the fuel-rich coal-air flow increases to more than two times of that before the concentration, which is beneficial to reduce heat of ignition to combustion required by different coal types. This part of pulverized coal, i.e., the pulverized coal in the fuel-rich coal-air flow, is burnt in advance to form the main flame, which heats and ignites the fuel-lean coal-air flow and other unburned pulverized coal particles. Moreover, by concentrating the primary coal-air flow, the staged combustion of the rich and lean pulverized coals can be effectively realized, which is conducive to form a strong reduction zone in the pulverized coal combustion flame, so that the N element released during the pulverized coal combustion is mainly transformed into $NH_3$ or $N_2$, inhibiting $NO_x$ production.

In an embodiment, the rich-lean output structure 130 includes a recirculation baffle 131 and a fuel-lean coal-air flow pipe 132 penetrating through the recirculation baffle 131. The recirculation baffle 131 is located at the outlet end of the primary coal-air flow pipe 121. The surface of the recirculation baffle 131 facing the primary coal-air flow pipe 121 has a recirculation slot 1311. The recirculation slot 1311 is configured to guide the fuel-rich coal-air flow to flow reversely to the pre-combustion chamber 111. The shape of the inner wall of the recirculation slot 1311 is straight and/or curved. A fuel-rich coal-air flow channel 133 with a circular cross-section is formed between the inner wall of the recirculation slot 1311 and the outer wall of the primary coal-air flow pipe for the reverse flowing of the fuel-rich coal-air flow. The fuel-lean coal-air flow pipe 132, having one end extending into the central area of the outlet end of the primary coal-air flow pipe 121, is configured to output the fuel-lean coal-air coming flow from the primary coal-air flow pipe 121.

With the further flowing of the pulverized coal air flow, when the pulverized coal air flow reaches the outlet end of the primary coal-air flow pipe 121, the air flow with the lower pulverized coal concentration in the central area directly faces the fuel-lean coal-air flow pipe 132, so that this part of the pulverized coal air flow is straightly ejected from the fuel-lean coal-air flow pipe 132 to form the fuel-lean coal-air flow. At the same time, the air flow with the higher pulverized coal concentration adjacent to the inner wall of the primary coal-air flow pipe 121 directly faces the recirculation slot 1311 of the recirculation baffle 131. Since the fuel-rich coal-air flow channel 133 in a circular shape is formed by the inner wall of the recirculation slot 1311 and the outer wall of the primary coal-air flow pipe 121, the high-concentration pulverized coal air flow will enter the fuel-rich coal-air flow channel 133. Guided by the inner wall of the recirculation slot 1311, the high-concentration pulverized coal air flow is sprayed into the pre-combustion chamber 111 in the reversed direction along the outer wall of the primary coal-air flow pipe 121, thereby forming the reversely ejected fuel-rich coal-air flow.

It can be understood that the primary coal-air flow pipe 121 and the first-stage recirculation zone F are adjacent to each other. In this way, the fuel-rich coal-air flow can flow next to the first-stage recirculation zone F, directly affected by the heat radiation of the high-temperature first-stage recirculation zone F, which is conducive to the temperature increasing and ignition of the fuel-rich coal-air flow. Since the fuel-rich coal-air flow is sprayed into the pre-combustion chamber 111 near the first-stage recirculation zone F, it is easier for the fuel-rich coal-air flow to be entrained into the first-stage recirculation zone F during the flowing. The rich coal-air flow swirls and burns in the first-stage recirculation zone F to release heat, then passes by the recirculation baffle 131, and is ejected out from the pre-combustion chamber 111. In addition, the primary coal-air flow flows in the primary coal-air flow pipe 121 and enters the pre-combustion chamber 111 through the recirculation baffle 131. When entering the pre-combustion chamber 111, the primary coal-air flow can cool the primary coal-air flow pipe 121 and the recirculation baffle 131 to realize a function of cooling protection.

Exemplarily, the bottom of the recirculation slot 1311 has an arc shape, and the side wall of the recirculation slot 1311 has a straight shape. In this way, an annular fuel-rich coal-air flow channel 133 with a U-shaped cross-section is formed between the inner wall of the recirculation slot 1311 and the outer wall of the primary coal-air flow pipe 121 to facilitate the reversely flowing of the pulverized coal air flow. The fuel-lean coal-air flow pipe 132 has a fuel-lean coal-air flow channel with a straight cylindrical shape.

Optionally, the primary coal-air flow pipe 121 and the recirculation baffle 131 are located on the central axis of the pre-combustion chamber 111. The fixing axle 122 is located on a central axis of the primary coal-air flow pipe 121.

In an embodiment, the recirculation baffle 131 has a conical shape, and the cross-sectional size of the end of the recirculation baffle 131 toward the primary coal-air flow pipe 121 is smaller than the cross-sectional size of the end of the recirculation baffle 131 away from the primary coal-air flow pipe 121. By adopting the conical recirculation baffle 131, a low pressure area can be formed at the side of the recirculation baffle 131 away from the primary coal-air flow pipe 121. In this way, when the high-temperature fluid generated in the combustion in the first-stage recirculation zone F passes by the conical recirculation baffle 131, a low-pressure zone can be formed behind the recirculation baffle 131, so that part of the high-temperature fluid will recirculate behind the recirculation baffle 131 to form a second-stage recirculation zone M. This part of the recirculated high-temperature fluid meets the fuel-lean coal-air flow ejected from the fuel-lean coal-air flow pipe 132 in the recirculation baffle 131, which will promote the temperature increasing of the fuel-lean coal-air flow, heating and igniting the fuel-lean coal-air flow. Then, the air flows and unburned pulverized coal particles in the pre-combustion chamber 111 are ejected out from the pre-combustion chamber 111.

In an embodiment, the rich-lean output structure 130 includes a fixing rib 134. The fixing rib 134 connects the recirculation baffle 131 and the primary coal-air flow pipe 121, which can ensure that the recirculation baffle 131 is reliably fixed to the outlet end of the primary coal-air flow pipe 121.

It can be understood that after the rich-lean separation of the primary coal-air flow by the primary coal-air structure 120, the weight of the coal particles contained in the fuel-lean coal-air flow accounts for 10%-20% of the total weight of pulverized coal, and the air volume of the fuel-lean coal-air flow accounts for 60% to 70% of the total air volume of the primary coal-air flow; the weight of the coal particles contained in the fuel-rich coal-air flow accounts for 80% to 90% of the total weight of pulverized coal, and the air volume of the fuel-rich coal-air flow accounts for 30%-40% of the total air volume of the primary coal-air flow. Due to the high concentration of pulverized coal in fuel-rich coal-air flow, the ignition heat of the fuel-rich coal-air flow is reduced, which is conducive to the ignition of the fuel-rich coal-air flow, and enhances combustion stability at a low load and coal type adaptability. Moreover, the pulverized coal flow burns under the fuel-rich condition, which is beneficial to reduce the generation of $NO_x$.

Figure 4:
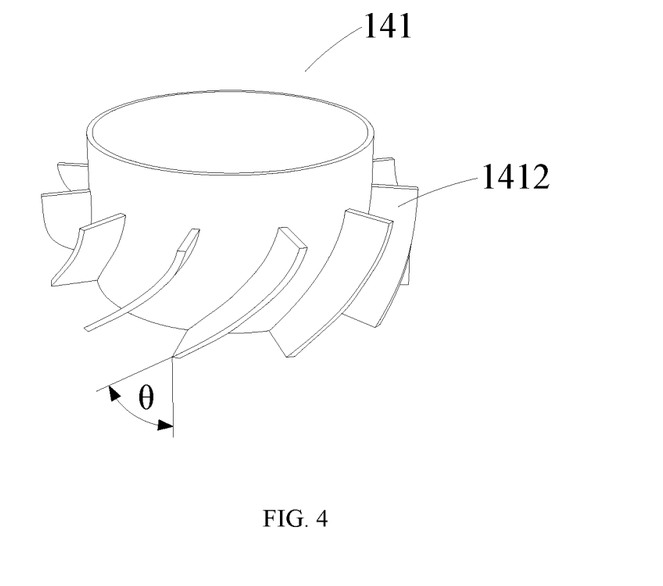
FIG. 4 is a perspective view of a strong-swirl inner secondary air assembly in the reverse-jet swirl pulverized coal burner with multi-stage recirculations shown in FIG. 1.
Figure 5:
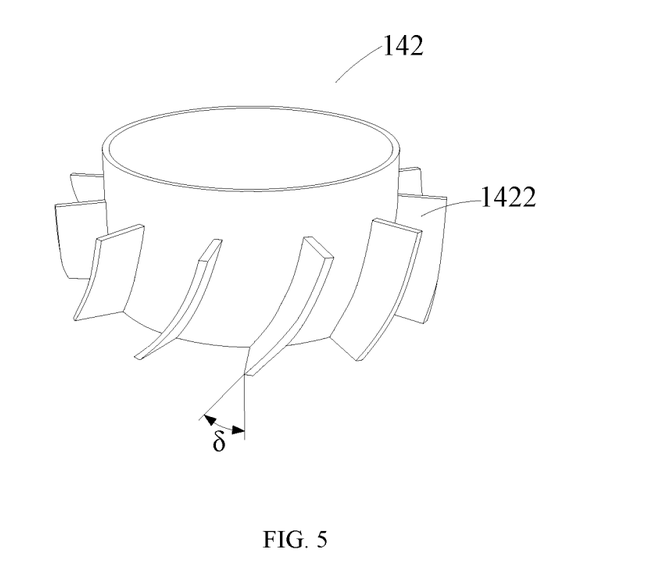
FIG. 5 is a perspective view of a weak-swirl inner secondary air assembly in the reverse-jet swirl pulverized coal burner with multi-stage recirculations shown in FIG. 1.

In an embodiment, the inner secondary air structure 140 includes a strong-swirl inner secondary air assembly 141, a weak-swirl inner secondary air assembly 142, and a direct-flow inner secondary air channel 143. The strong-swirl inner secondary air assembly 141 is sleeved outside the portion of the primary coal-air structure 120 outside the pre-combustion housing 110. The weak-swirl inner secondary air assembly 142 is sleeved outside the strong-swirl inner secondary air assembly 141. The direct-flow inner secondary air channel 143 is sleeved outside the weak-swirl inner secondary air assembly 142. The tangential swirling speeds of the secondary air respectively conveyed by the strong-swirl inner secondary air assembly 141, the weak-swirl inner secondary air assembly 142, and the direct-flow inner secondary air channel 143 gradually decrease. That is, the primary coal-air structure 120, the strong-swirl inner secondary air assembly 141, the weak-swirl inner secondary air assembly 142, and the direct-flow inner secondary air channel 143 are orderly arranged from the inside to the outside, and the strong-swirl inner secondary air assembly 141, the weak-swirl inner secondary air assembly 142 and the direct-flow inner secondary air channel 143 are arranged next to each other from the inside to the outside.

In other words, the inner secondary air is divided into three layers. The swirling strength of the inner secondary air conveyed by the strong-swirl inner secondary air assembly 141 is greater than the swirling strength of the inner secondary air conveyed by the weak-swirl inner secondary air assembly 142. The direct-flow inner secondary air channel 143 conveys the direct-flow inner secondary air. In this way, the inner secondary air conveyed by the strong-swirl inner secondary air assembly 141 has a larger tangential swirling speed when being sprayed into the pre-combustion chamber 111, the inner secondary air conveyed by the weak-swirl inner secondary air assembly 142 has a smaller tangential swirling speed when being sprayed into the pre-combustion chamber 111, and the inner secondary air conveyed by the direct-flow inner secondary air channel 143 has no tangential swirling speed and is sprayed into the pre-combustion chamber 111 as a direct flow. In other words, the strong-swirl inner secondary air assembly 141 conveys the strong swirling inner secondary air, the weak-swirl inner secondary air assembly 142 conveys the weak swirling inner secondary air, and the direct-flow inner secondary air channel 143 conveys the direct-flow inner secondary air.

After the overall inner secondary air is sprayed into the pre-combustion chamber 111 as above, a speed distribution is formed such that the swirling strength of the inner secondary air is gradually reduced to zero from the inner side to the outer side in the pre-combustion chamber 111. Since the inner secondary air adjacent to the primary coal-air flow pipe 121 has a relatively large swirling tangential speed, during the high-speed swirling of the air flow, a low pressure zone is formed in the central area of the swirling flow. In addition, since the cone section 112 has an inclination angle, during the flowing of the inner secondary air from top to bottom in the pre-combustion chamber 111, the flow area of the air flow gradually expands, so that the flow rate of the air flow decreases, and the static pressure gradually increases. The above two reasons work together to make part of the inner secondary air flow reversely to the low pressure zone during the flowing of the inner secondary air in the pre-combustion chamber 111, thus forming the first-stage recirculation zone F.

In an embodiment, the strong-swirl inner secondary air assembly 141 includes a strong-swirl inner secondary air channel 1411 and strong-swirl axial vanes 1412 disposed in the strong-swirl inner secondary air channel 1411. The strong-swirl axial vanes 1412 are configured to make the inner secondary air in the strong-swirl inner secondary air channel 1411 have a tangential swirling speed.

In an embodiment, the outlet angle θ of the strong-swirl axial vane 1412 ranges from 50° to 80°. In other words, the outlet angle θ of the strong-swirl axial vane 1412 is relatively large, which can make the inner secondary air flowing therethrough have a relatively large tangential swirling speed. Optionally, the strong-swirl axial vane 1412 is an axial vane.

In an embodiment, the weak-swirl inner secondary air assembly 142 includes a weak-swirl inner secondary air channel 1421 and weak-swirl axial vanes 1422 disposed in the weak-swirl inner secondary air channel 1421. The weak-swirl axial vanes 1422 are configured to make the inner secondary air in the weak-swirl inner secondary air channel 1421 have a tangential swirling speed.

In an embodiment, the outlet angle δ of the weak-swirl axial vane 1422 ranges from 20° to 50°. In other words, the outlet angle δ of the weak-swirl axial vane 1422 is relatively small, which can make the inner secondary air flowing therethrough have a relatively small tangential swirling speed. Optionally, the weak-swirl axial vane 1422 is an axial vane.

Optionally, the direct-flow inner secondary air channel 143 is sleeved outside the weak-swirl inner secondary air channel 1421 through supporting ribs 1431. The supporting ribs 1431 are flat in order to avoid producing a tangential swirling speed of the inner secondary air.

The three layers of the strong-swirl inner secondary air assembly 141, the weak-swirl inner secondary air assembly 142, and the direct-flow inner secondary air channel 143 are configured to spray the inner secondary air into the pre-combustion chamber 111. The size of the recirculation zone and the combustion state of the pulverized coal in the pre-combustion chamber 111 can be flexibly adjusted by adjusting the air volume distribution among the secondary air flows, thereby increasing the adjustment flexibility of the burner, which is conducive to the flexible adjustment of the ignition and stable combustion of the pulverized coal under different boiler loads and coal types. In addition, the adjustment flexibility of the suppression of $NO_x$ production is also increased.

In an embodiment, the reverse jet swirl pulverized coal burner 100 further includes an annular connector 160. The annular connector 160 is located between the strong-swirl inner secondary air assembly 141 and the primary coal-air structure 120, and connects and fixes the strong-swirl inner secondary air assembly 141 to the primary coal-air structure 120. The annular connector 160 can make a certain distance between the strong-swirl inner secondary air assembly 141 and the primary coal-air structure 120 to facilitate the formation of the first-stage recirculation zone F in the pre-combustion chamber 111.

Moreover, the direct-flow inner secondary air channel 143 conveys the direct-flow inner secondary air along the inner wall of the pre-combustion housing 110, which can keep the region adjacent to the inner wall of the pre-combustion housing 110 in an oxidizing atmosphere and prevent unburned coal particles or molten minerals from reaching the inner wall and coking on the wall. In addition, the direct-flow inner secondary air flowing adjacent to the inner wall of the pre-combustion housing 110 can also cool and protect the pre-combustion housing 110.

In addition, the outer secondary air structure 150 is located outside the pre-combustion housing 110, and is configured to transport the outer secondary air. During flowing, the outer secondary air can take away the heat adjacent to the inner wall of the pre-combustion housing 110, thereby further protecting and cooling the pre-combustion housing 110.

Figure 6:
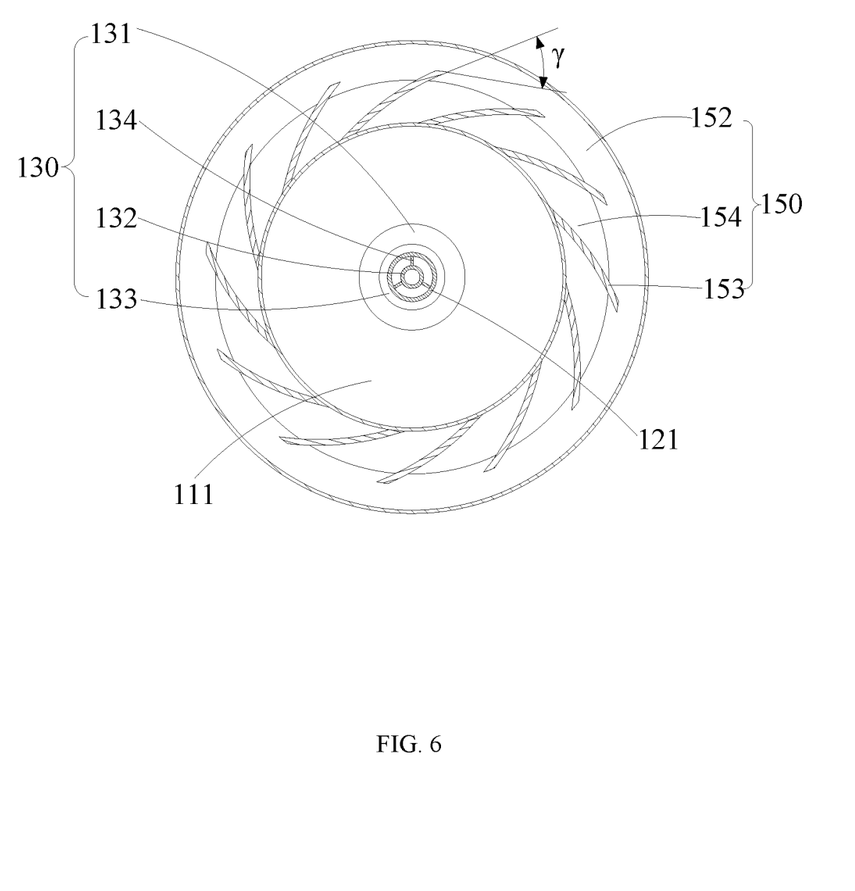
FIG. 6 is a cross-sectional view along B-B of the reverse-jet swirl pulverized coal burner with multi-stage recirculations shown in FIG. 2.
Figure 7:
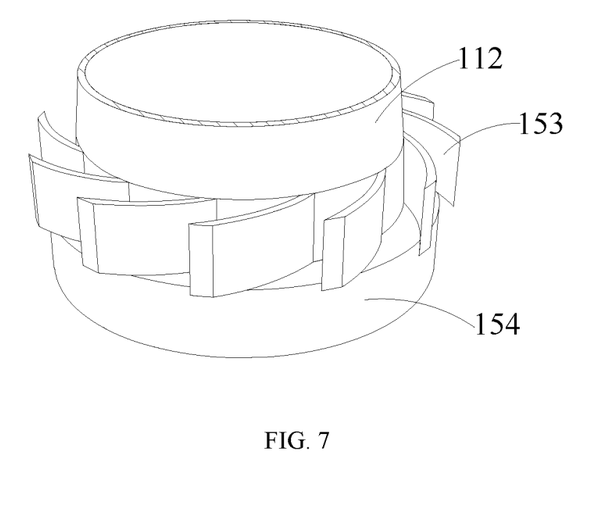
FIG. 7 is a perspective view of tangential vanes installed on a pre-combustion housing of the reverse-jet swirl pulverized coal burner with multi-stage recirculations shown in FIG. 1.

In an embodiment, the outer secondary air structure 150 includes an outer secondary air inlet channel 151, an outer secondary air outlet channel 152, and tangential vanes 153. The outer secondary air inlet channel 151 and the outer secondary air outlet channel 152 are connected and fluid communicated in a stepped manner. The tangential vanes 153 are disposed in the connection area between the outer secondary air inlet channel 151 and the outer secondary air outlet channel 152. The tangential vanes 153 are configured to make the outer secondary air flowing therethrough rotate at a high speed. The outer secondary air is introduced from the outer secondary air inlet channel 151. Under the action of the tangential vanes 153, the outer secondary air entered the outer secondary air outlet channel 152 can swirl at a high speed and can be swirly ejected from the outer secondary air outlet channel 152 at the high speed. The high-speed swirly ejected outer secondary air helps to form a low-pressure zone at the housing outlet of the pre-combustion housing 110, thereby forming the third-stage recirculation zone N, which further promotes the burnout and stable combustion of the unburned pulverized coal ejected from the pre-combustion chamber 111.

By setting three stages of high-temperature fluid recirculation, i.e., the first-stage recirculation zone F, the second-stage recirculation zone M, and the third-stage recirculation zone N, the coal particles in different combustion stages are heated, which is beneficial to ignition, stable combustion, and burnout of pulverized coal under different coal types and boiler load conditions.

In an embodiment, the outlet angle γ of the tangential vane 153 ranges from 15° to 40°.

In an embodiment, the outer secondary air structure 150 further includes a separation annulus 154. The separation annulus 154 is disposed at an end of the outer secondary air outlet channel 152, and located on the outer wall of the expansion section 113. The separation annulus 154 can separate the flame, sprayed from the pre-combustion chamber 111, from the outer secondary air for a distance, thereby delaying the mixing between the outer secondary air and the unburned pulverized coal contained in the flame, and prolonging the combustion time of the pulverized coal in a reducing atmosphere to suppress $NO_x$ production.

The working principle of the reverse-jet swirl pulverized coal burner 100 with multi-stage recirculations of the present application is as follows:

The primary coal-air flow is introduced from the primary coal-air flow pipe 121, and flows along a straight line at the initial stage after entering the primary coal-air flow pipe 121. Under the action of the swirl vanes 123, the primary coal-air flow passing the swirl vanes 123 is transformed from a direct flow to a swirling flow. During the high-speed swirling of the primary coal-air flow, the coal particles, due to the high density thereof, are subjected to a large centrifugal force and thrown to the region adjacent to the inner wall of the primary coal-air flow pipe 121, so that the pulverized coal in the region adjacent to the inner wall of the primary coal-air flow pipe 121 has a higher concentration, and the pulverized coal in the central area of the primary coal-air flow pipe 121 has a lower concentration. With the further flowing of the pulverized coal air flow, when the pulverized coal air flow reaches the outlet end of the primary coal-air flow pipe 121, the air flow with the lower pulverized coal concentration in the central area directly faces the fuel-lean coal-air flow pipe 132, so that this part of the pulverized coal air flow is straightly ejected from the fuel-lean coal-air flow pipe 132, thereby forming the fuel-lean coal-air flow. At the same time, the air flow with the higher pulverized coal concentration adjacent to the inner wall of the primary coal-air flow pipe 121 directly faces the recirculation slot 1311 of the recirculation baffle 131. Since the fuel-rich coal-air flow channel 133 in a circular shape is formed by the inner wall of the recirculation slot 1311 and the outer wall of the primary coal-air flow pipe 121, the high-concentration pulverized coal air flow will enter the fuel-rich coal-air flow channel 133. Guided by the recirculation slot 1311, the high-concentration pulverized coal air flow is sprayed into the pre-combustion chamber 111 in the reversed direction along the outer wall of the primary coal-air flow pipe 121, thereby forming the reversely ejected fuel-rich coal-air flow.

In the pre-combustion chamber 111, the inner secondary air is divided into three layers, which are respectively introduced from the strong-swirl inner secondary air assembly 141, the weak-swirl inner secondary air assembly 142, and the direct-flow inner secondary air channel 143. Wherein, due to the larger outlet angle of the strong-swirl axial vanes 1412, the inner secondary air entered the strong-swirl inner secondary air channel 1411 produces a larger tangential swirling speed when being sprayed into the pre-combustion chamber 111; due to the smaller outlet angle of the weak-swirl axial vanes 1422, the inner secondary air entered the weak-swirl inner secondary air channel 1421 produces a smaller tangential swirling speed when being sprayed into the pre-combustion chamber 111; the inner secondary air entered the direct-flow inner secondary air channel 143 is not guided by any guiding vanes and is sprayed into the pre-combustion chamber 111 as a direct flow. After the overall inner secondary air is sprayed into the pre-combustion chamber 111 as above, a speed distribution is formed such that the swirling strength of the inner secondary air is gradually reduced to zero from the inner side to the outer side in the pre-combustion chamber 111.

Since the inner secondary air adjacent to the primary coal-air flow pipe 121 has a relatively large swirling tangential speed, during the high-speed swirling of the air flow, a low pressure zone is formed in the central area of the swirling flow. In addition, since the inner wall of the pre-combustion housing 110 has an inclination angle, during the flowing of the inner secondary air from top to bottom in the pre-combustion chamber 111, the flow area of the air flow gradually expands, so that the flow rate of the air flow decreases, and the static pressure gradually increases. The above two reasons work together to make part of the inner secondary air flow reversely to the low pressure zone during the flowing of the inner secondary air in the pre-combustion chamber 111, thus forming the first-stage recirculation zone F.

Since the fuel-rich coal-air flow is injected to the place adjacent to the first-stage recirculation zone F, the fuel-rich coal-air flow can be easily entrained into the first-stage recirculation zone F during the flowing. The fuel-rich coal-air flow whirls, burns, and releases heat in the first-stage recirculation zone F, and then passes by the recirculation baffle 131 and ejects out from the pre-combustion chamber 111.

When the high-temperature flow passes by the conical recirculation baffle 131, a low-pressure zone can be formed behind the recirculation baffle 131, so that part of the high-temperature fluid will recirculate behind the recirculation baffle 131 to form a second-stage recirculation zone M. This part of the recirculated high-temperature fluid meets the fuel-lean coal-air flow ejected from the recirculation baffle 131, which will promote the temperature increasing of the fuel-lean coal-air flow, heating and igniting the fuel-lean coal-air flow. Then, the air flows and unburned pulverized coal particles in the pre-combustion chamber 111 are ejected out from the pre-combustion chamber 111. At this time, the outer secondary air is introduced from the outer secondary air inlet channel 151. Passing by the tangential vanes 153, the outer secondary air entered the outer secondary air outlet channel 152 swirls at a high speed and swirly ejected from the outer secondary air outlet channel 152 at the high speed. The high-speed swirly ejected outer secondary air helps to form the third-stage recirculation zone N at the housing outlet of the pre-combustion housing 110, thereby forming the high temperature recirculation fluid at the outlet of the pre-combustion chamber 111, which further promotes the burnout and stable combustion of the unburned pulverized coal ejected from the pre-combustion chamber 111.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present application.

The above-described embodiments are only several implementations of the present application, and the descriptions are relatively specific and detailed, but they should not be construed as limiting the scope of the present application. It should be understood by those of ordinary skill in the art that various modifications and improvements can be made without departing from the concept of the present application, and all fall within the protection scope of the present application. Therefore, the patent protection of the present application shall be defined by the appended claims.

What is claimed is:

1. A reverse-jet swirl pulverized coal burner with multi-stage recirculations, comprising:
    a pre-combustion housing, the pre-combustion housing having a pre-combustion chamber and a housing outlet located on one side of the pre-combustion chamber;
    a primary coal-air structure passing through the pre-combustion housing and extending into the pre-combustion chamber, the primary coal-air structure being configured to separate a primary coal-air flow into a fuel-rich coal-air flow and a fuel-lean coal-air flow, and an outlet end of the primary coal-air structure extending toward the housing outlet;
    a rich-lean output structure disposed at the outlet end of the primary coal-air structure, the rich-lean output structure being configured to output the fuel-lean coal-air flow and block the fuel-rich coal-air flow to make the fuel-rich coal-air flow reversely flow to the pre-combustion chamber;
    an inner secondary air structure disposed on the pre-combustion housing and around the primary coal-air structure, the inner secondary air structure is configured to introduce an inner secondary air into the pre-combustion chamber, thereby forming a first-stage recirculation zone in the pre-combustion chamber and forming a second-stage recirculation zone at an end of the rich-lean output structure away from the primary coal-air structure; and
    an outer secondary air structure sleeved outside the pre-combustion housing, the outer secondary air structure being configured to transport an outer secondary air, thereby forming a third-stage recirculation zone at the housing outlet;
    wherein the primary coal-air structure comprises a primary coal-air flow pipe, a fixing axle, and a plurality of swirl vanes; the fixing axle is located adjacent to an outlet end of the primary coal-air flow pipe; the plurality of swirl vanes are connected to an inner wall of the primary coal-air flow pipe and the fixing axle, and are configured to separate the primary coal-air flow into the fuel-rich coal-air flow and the fuel-lean coal-air flow.

2. The reverse-jet swirl pulverized coal burner with multi-stage recirculations of claim 1, wherein the pre-combustion housing comprises a cone section and an expansion section connected to the cone section, an end of the expansion section away from the cone section is the housing outlet of the pre-combustion housing;
    an inclination angle of the expansion section is greater than an inclination angle of the cone section.

3. The reverse-jet swirl pulverized coal burner with multi-stage recirculations of claim 2, wherein the outer secondary air structure comprises an outer secondary air inlet channel, an outer secondary air outlet channel, and tangential vanes; the outer secondary air inlet channel and the outer secondary air outlet channel are connected and fluid communicated in a stepped manner; the tangential vanes are disposed in a connection area between the outer secondary air inlet channel and the outer secondary air outlet channel.

4. The reverse-jet swirl pulverized coal burner with multi-stage recirculations of claim 3, wherein an outlet angle $\gamma$ of the tangential vane ranges from 15° to 40°.

5. The reverse-jet swirl pulverized coal burner with multi-stage recirculations of claim 3, wherein the outer secondary air structure further comprises a separation annulus; the separation annulus is disposed at an end of the outer secondary air outlet channel, and located on an outer wall of the expansion section.

6. The reverse-jet swirl pulverized coal burner with multi-stage recirculations of claim 1, wherein the inclination angle $\alpha$ of the cone section satisfies $0°<\alpha\leq20°$, and the inclination angle $\beta$ of the expansion section is in a range from 20° to 50°.

7. The reverse-jet swirl pulverized coal burner with multi-stage recirculations of claim 1, wherein the rich-lean output structure comprises a recirculation baffle and a fuel-lean coal-air flow pipe penetrating through the recirculation baffle;
    the recirculation baffle is located at the outlet end of the primary coal-air flow pipe; a surface of the recirculation baffle facing the primary coal-air flow pipe has a recirculation slot; the recirculation slot is configured to guide the fuel-rich coal-air flow to flow reversely to the pre-combustion chamber; a shape of an inner wall of the recirculation slot is straight or curved; a fuel-rich coal-air flow channel with a circular cross-section is formed between the inner wall of the recirculation slot and an outer wall of the primary coal-air flow pipe to reverse the fuel-rich coal-air flow;
    the fuel-lean coal-air flow pipe, having one end extending into a central area of the outlet end of the primary coal-air flow pipe, is configured to output the fuel-lean coal-air flow coming from the primary coal-air flow pipe.

8. The reverse-jet swirl pulverized coal burner with multi-stage recirculations of claim 7, wherein the recirculation baffle has a conical shape, and a cross-sectional size of an end of the recirculation baffle toward the primary coal-air flow pipe is smaller than a cross-sectional size of another end of the recirculation baffle away from the primary coal-air flow pipe;
    the rich-lean output structure comprises a fixing rib that connects the recirculation baffle to the primary coal-air flow pipe.

9. The reverse-jet swirl pulverized coal burner with multi-stage recirculations of claim 1, wherein the inner secondary air structure comprises a strong-swirl inner secondary air assembly, a weak-swirl inner secondary air assembly, and a direct-flow inner secondary air channel; the strong-swirl inner secondary air assembly is sleeved outside the primary coal-air structure, the weak-swirl inner secondary air assembly is sleeved outside the strong-swirl inner secondary air assembly, the direct-flow inner secondary air channel is sleeved outside the weak-swirl inner secondary air assembly;

tangential swirling speeds of the secondary air respectively conveyed by the strong-swirl inner secondary air assembly, the weak-swirl inner secondary air assembly, and the direct-flow inner secondary air channel gradually decrease.

10. The reverse-jet swirl pulverized coal burner with multi-stage recirculations of claim 9, wherein the strong-swirl inner secondary air assembly comprises a strong-swirl inner secondary air channel and strong-swirl axial vanes disposed in the strong-swirl inner secondary air channel; the strong-swirl axial vanes are configured to make the inner secondary air in the strong-swirl inner secondary air channel have a tangential swirling speed;

an outlet angle θ of the strong-swirl axial vanes ranges from 50° to 80°.

11. The reverse-jet swirl pulverized coal burner with multi-stage recirculations of claim 9, wherein the weak-swirl inner secondary air assembly comprises a weak-swirl inner secondary air channel and weak-swirl axial vanes disposed in the weak-swirl inner secondary air channel; the weak-swirl axial vanes are configured to make the inner secondary air in the weak-swirl inner secondary air channel have a tangential swirling speed;

an outlet angle δ of the weak-swirl axial vanes ranges from 20° to 50°.

12. The reverse-jet swirl pulverized coal burner with multi-stage recirculations of claim 9, wherein the multi-stage recirculation reverse-jet swirl pulverized coal burner further comprises an annular connector; the annular connector is located between the strong-swirl inner secondary air assembly and the primary coal-air structure, and connects and fixes the strong-swirl inner secondary air assembly to the primary coal-air structure.

13. A reverse-jet swirl pulverized coal burner with multi-stage recirculations, comprising:

a pre-combustion housing, the pre-combustion housing having a pre-combustion chamber and a housing outlet located on one side of the pre-combustion chamber;

a primary coal-air structure passing through the pre-combustion housing and extending into the pre-combustion chamber, the primary coal-air structure being configured to separate a primary coal-air flow into a fuel-rich coal-air flow and a fuel-lean coal-air flow, and an outlet end of the primary coal-air structure extending toward the housing outlet;

a rich-lean output structure disposed at the outlet end of the primary coal-air structure, the rich-lean output structure being configured to output the fuel-lean coal-air flow and block the fuel-rich coal-air flow to make the fuel-rich coal-air flow reversely flow to the pre-combustion chamber;

an inner secondary air structure disposed on the pre-combustion housing and around the primary coal-air structure, the inner secondary air structure is configured to introduce an inner secondary air into the pre-combustion chamber, thereby forming a first-stage recirculation zone in the pre-combustion chamber and forming a second-stage recirculation zone at an end of the rich-lean output structure away from the primary coal-air structure; and an outer secondary air structure sleeved outside the pre-combustion housing, the outer secondary air structure being configured to transport an outer secondary air, thereby forming a third-stage recirculation zone at the housing outlet;

wherein the pre-combustion housing comprises a cone section and an expansion section connected to the cone section, an end of the expansion section away from the cone section is the housing outlet of the pre-combustion housing;

an inclination angle of the expansion section is greater than an inclination angle of the cone section;

wherein the outer secondary air structure comprises an outer secondary air inlet channel, an outer secondary air outlet channel, and tangential vanes; the outer secondary air inlet channel and the outer secondary air outlet channel are connected and fluid communicated in a stepped manner; the tangential vanes are disposed in a connection area between the outer secondary air inlet channel and the outer secondary air outlet channel.

14. The reverse-jet swirl pulverized coal burner with multi-stage recirculations of claim 13, wherein an outlet angle γ of the tangential vane ranges from 15° to 40°.

15. The reverse-jet swirl pulverized coal burner with multi-stage recirculations of claim 13, wherein the outer secondary air structure further comprises a separation annulus; the separation annulus is disposed at an end of the outer secondary air outlet channel, and located on an outer wall of the expansion section.

* * * * *